United States Patent
Schoepf et al.

(10) Patent No.: US 9,618,066 B2
(45) Date of Patent: Apr. 11, 2017

(54) BRAKE DISC AND METHOD FOR TREATING THE SURFACE OF A BRAKE DISC

(75) Inventors: Martin Schoepf, Stuttgart (DE); Bernd Schaefer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/977,192

(22) PCT Filed: Nov. 8, 2011

(86) PCT No.: PCT/EP2011/069619
§ 371 (c)(1),
(2), (4) Date: Sep. 17, 2013

(87) PCT Pub. No.: WO2012/089386
PCT Pub. Date: Jul. 5, 2012

(65) Prior Publication Data
US 2014/0000996 A1     Jan. 2, 2014

(30) Foreign Application Priority Data
Dec. 29, 2010   (DE) .......................... 10 2010 064 350

(51) Int. Cl.
    *B60T 1/06*       (2006.01)
    *B32B 3/28*       (2006.01)
    *F16D 65/12*     (2006.01)
    *B23P 13/00*    (2006.01)

(52) U.S. Cl.
CPC ............ *F16D 65/127* (2013.01); *B23P 13/00* (2013.01); *F16D 2250/003* (2013.01); *F16D 2250/0046* (2013.01); *Y10T 29/49995* (2015.01)

(58) Field of Classification Search
USPC ....... 188/18 A, 218 XL; 29/898.09; 427/446
See application file for complete search history.

(56) References Cited

U.S. PATENT DOCUMENTS

| | | | |
|---|---|---|---|
| 2,255,024 A | | 9/1941 | Eksergian |
| 5,353,553 A | * | 10/1994 | Miller .............................. 451/32 |
| 5,480,007 A | * | 1/1996 | Hartford ..................... 188/18 A |
| 6,290,032 B1 | | 9/2001 | Patrick et al. |
| 7,220,458 B2 | * | 5/2007 | Hollis et al. .................. 427/446 |
| 7,709,145 B2 | * | 5/2010 | Abd Elhamid et al. ...... 429/210 |

(Continued)

FOREIGN PATENT DOCUMENTS

| | | |
|---|---|---|
| DE | 10 2006 045 275 B3 | 2/2008 |
| GB | 2 268 511 A | 1/1994 |

(Continued)

OTHER PUBLICATIONS

International Search Report corresponding to PCT Application No. PCT/EP2011/069619, mailed Feb. 6, 2012 (German and English language document) (8 pages).

*Primary Examiner* — Christopher Schwartz
(74) *Attorney, Agent, or Firm* — Maginot, Moore & Beck LLP

(57) ABSTRACT

A method is used to treat a surface of a brake disc to increase the adhesive power of a coating to the surface. The method includes roughening the surface by introducing at least one depression in the surface. The width of the depression is widened with increasing depth of the depression. A positive connection is formed between the brake disc and the coating via an undercut.

15 Claims, 4 Drawing Sheets

(56) References Cited

U.S. PATENT DOCUMENTS

| | | |
|---|---|---|
| 2005/0064146 A1 | 3/2005 | Hollis et al. |
| 2006/0027429 A1* | 2/2006 | Knight et al. ............... 188/74 |
| 2012/0037465 A1* | 2/2012 | Abe et al. .................. 188/73.1 |
| 2012/0148769 A1* | 6/2012 | Bunker et al. .............. 428/34.1 |

FOREIGN PATENT DOCUMENTS

| | | |
|---|---|---|
| JP | 56-107817 A | 8/1981 |
| JP | 57-41101 A | 3/1982 |
| JP | 2000-205312 A | 7/2000 |
| JP | 2004-513311 A | 4/2004 |
| JP | 2006-300251 A | 11/2006 |
| WO | 95/02130 A1 | 1/1995 |
| WO | 2010/015229 A1 | 2/2010 |
| WO | WO2010146648 * | 12/2010 |

* cited by examiner

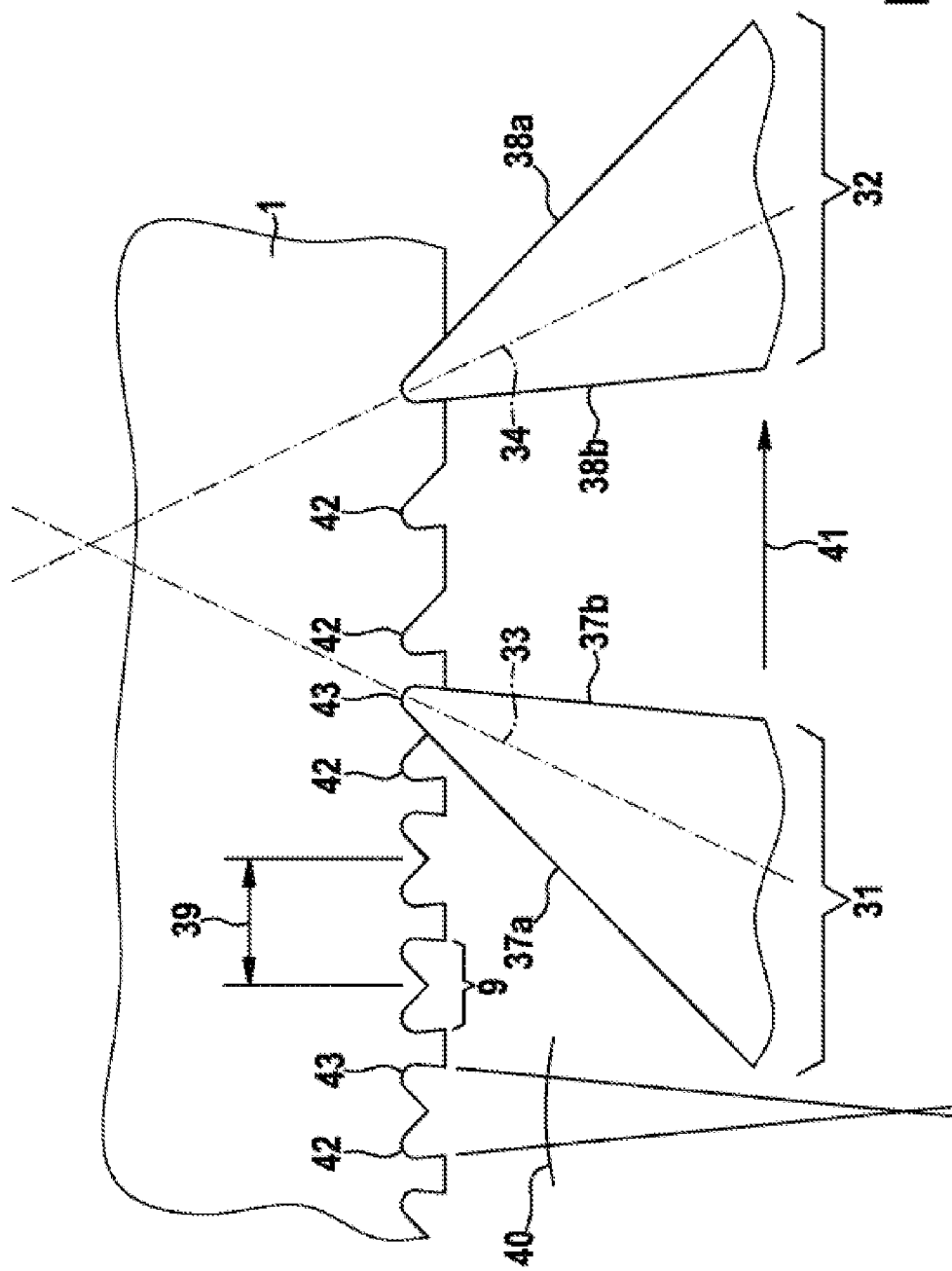

BRAKE DISC AND METHOD FOR TREATING THE SURFACE OF A BRAKE DISC

This application is a 35 U.S.C. §371 National Stage Application of PCT/EP2011/069619, filed on Nov. 8, 2011, which claims the benefit of priority to Serial No. DE 10 2010 064 350.5, filed on Dec. 29, 2010 in Germany, the disclosures of which are incorporated herein by reference in their entirety.

The present disclosure relates to a brake disk and to a method for treating a surface, in particular that of a brake disk, wherein, to increase the adhesive power of a coating on the surface, said surface is roughened by introducing into the surface at least one depression, the width of which increases with increasing depth of the depression, and a positive connection between the brake disk and the coating is produced by means of this undercut.

The disclosure furthermore relates to a cutting tool for producing at least one depression in a surface, in particular in the surface of a brake disk, wherein the cutting tool produces at least one depression in the surface in such a way that the width of said depression increases with increasing depth. For this purpose, the cutting tool has at least two cutting edges, wherein the two cutting edges are at a slope angle to the perpendicular of the workpiece surface and the two cutting edges simultaneously form a common plane in the orthogonal direction.

BACKGROUND

The practice, in the case of thermal coating processes, such as flame spraying or plasma spraying, of subjecting the surfaces to activation before coating is known from the prior art. Normally, this activation consists in roughening the surface by machining the surface with pressurized abrasive particles, in particular sharp-edged particles, such as white corundum. This step is also referred to as a jet machining process.

Jet machining processes of this kind have the disadvantage that the characteristics of the surfaces produced cannot be accurately reproduced and that the associated adhesive power of the coatings may be subject to large fluctuations, which is inappropriate for large-scale manufacture.

SUMMARY

The focus of the present disclosure is to produce accurately reproducible surface activation in order to apply surface coatings to the activated surfaces with as small as possible fluctuations in the process parameters.

According to the disclosure, this is achieved by the features described below. Advantageous developments and embodiments will become apparent from the description below.

Here, the disclosure comprises a workpiece, in particular a brake disk, which has the surface activation according to the disclosure, and furthermore comprises a method for surface activation and a tool, in particular a cutting tool, for carrying out the surface activation on workpiece surfaces.

To increase the adhesive power of a coating on the surface, the workpiece, in particular the brake disk, having the surface according to the disclosure has structuring, wherein the structuring of the surface has at least one depression, the width of which increases with increasing depth. This makes it possible to produce a positive connection between a coating to be applied subsequently and the workpiece, wherein the positive connection exhibits accurate reproducibility.

It is advantageous if the at least one depression has a cross-sectional profile in a dovetail shape, thereby giving rise to positive engagement.

It is furthermore advantageous that the at least one depression is in the form of one or more concentric circles or in the form of a spiral depression, similar to the groove in a gramophone record. This makes it possible to carry out the surface activation by means of machining of the material, in particular a turning process, wherein the surface activation can be carried out very quickly and economically.

It is advantageous if the thickness of the coating to be applied is greater than the depth of the at least one depression, with the result that the depression is completely filled with coating material and a completely flat surface is formed after the coating process.

It is furthermore advantageous that the coating is composed of a material with a high abrasion resistance and the surface, in particular the surface of the brake disk, is very wear resistant. It is particularly advantageous if the surface activation is carried out by means of at least one depression, which produces a positive connection between the coating and the brake disk, on the regions of the brake disk at which the coated brake disk subsequently comes into contact with the brake pads.

Within the scope of the disclosure, a method for treating a surface, in particular the surface of a brake disk, for increasing the adhesion of a coating on the surface is provided, wherein at least one depression, the width of which increases with increasing depth, is formed on the surface. The positive engagement between the workpiece surface and the coating is thereby made possible according to the disclosure.

It is advantageous if the at least one depression is produced by machining of the material, in particular by means of turning.

It is advantageous if the at least one depression is produced in a plurality of steps. After the turning tool has been plunged into the surface of the material, a first undercut is produced on the first side flank of the depression in a first step by moving the turning tool in a counterclockwise first direction relative to the workpiece, thereby producing the first undercut. In a second step, a second undercut is produced on the opposite side flank of the depression by moving the cutting tool in a clockwise second direction, which is opposite to the first direction. By means of this step, a further undercut is produced. After the cutting tool has been moved into a central position and moved away from the workpiece, two undercuts remain, jointly producing a depression, the width of which increases with increasing depth and which has a profile in a dovetail shape. By means of the two undercuts formed in opposite directions, positive engagement with the coating subsequently applied is produced, anchoring the coating permanently to the workpiece.

It is advantageous if a plurality of depressions is produced simultaneously with a single tool by using a cutting tool with a plurality of cutting edges of the same kind arranged adjacent to one another in the form of a comb. It is thereby possible to achieve a multiple benefit since a multiplicity of adjacent depressions of the same kind is produced in a single working step, thereby making it possible to carry out surface activation more quickly and hence more economically.

It is furthermore advantageous if a cutting tool having what is referred to as standard cutting inserts can be used since it is thereby possible to achieve economical production and maintenance of the tool and it is thereby likewise possible to carry out rapid surface activation. For this purpose, a tool having a plurality of cutting edges, in particular two cutting edges, is provided, where the matched feed rate of the tool relative to the workpiece is matched to the speed of rotation of the workpiece in such a way that a first undercut is produced on the first side flank of the depression with a first cutting edge of the tool and, at the same time, a second undercut is produced on the opposite side flank of the depression with a second cutting edge of the tool. Here, the two undercuts are arranged in such a way, by virtue of the matched feed rate, that they jointly form a common depression, wherein the width of the cross-sectional profile of the depression increases with increasing depth and, once again, a cross-sectional profile in a dovetail shape is formed. Here, the first undercut and the second undercut are produced simultaneously and are produced in a spiral shape across the surface of the workpiece by virtue of the feed rate, like the sound groove in a gramophone record.

According to the disclosure, a cutting tool for producing at least one depression in a surface, in particular in the surface of a brake disk, is furthermore provided, wherein the cutting tool is configured in such a way that it introduces at least one depression into the surface, wherein the width of the at least one depression increases with increasing depth. This can advantageously be produced by means of a cutting tool which has at least two cutting edges, wherein the first cutting edge has a slope angle to the perpendicular of the workpiece surface and produces a first part of the at least one depression, and the second cutting edge has a slope angle to the perpendicular of the workpiece surface in the opposite direction to the slope angle of the first cutting edge and produces a second part of the at least one depression, and the two cutting edges form a common plane.

It is advantageous if the at least two cutting edges of the cutting tool slope at an angle to the center line of the tool, with the result that said edges converge. However, there is also the possibility here that the point of intersection of the two extension lines of the cutting edges lie within the workpiece or, alternatively, on the side of the tool facing away from the workpiece, depending on which embodiment of the cutting tool is being considered, wherein both form embodiments of the disclosure. Here, the center line of the tool is to be taken as being arranged parallel to the perpendicular of the workpiece surface.

It is advantageous if the at least two cutting edges are arranged in a dovetail shape, with the result that the common points of intersection of the two lateral cutting edges lies on the side of the cutting tool facing away from the workpiece. As a result, the cutting edges are arranged facing away from one another, thereby giving a substantially tooth-shaped profile similar to the profile of the depression, but merely of narrower configuration than the latter.

It is furthermore advantageous that the cutting tool has a multiplicity of cutting edges of the same type arranged in a dovetail shape, thereby making it possible to produce a plurality of depressions of the same type in a single pass and providing a multiple benefit.

It is particularly advantageous here if the multiplicity of cutting edges of the same type arranged in a dovetail shape is arranged at uniform intervals in a line, giving rise to a comb-like tool shape. In this case, the cutting tool can be of integral configuration.

According to the disclosure, it is furthermore advantageous that the tool for producing the depression takes place in such a way that, after the vertical plunging of the cutting tool into the workpiece, a first movement parallel to the workpiece surface is carried out, thereby producing a first undercut, which forms a first side flank of the depression. By means of a subsequent movement of the cutting tool in the opposite direction relative to the workpiece, which likewise takes place parallel to the workpiece surface, a second undercut is produced, the profile of which is formed as a mirror image of the first undercut and which forms a second side flank of the depression. By means of the two undercuts formed as mirror images of one another, which form the two side flanks of the depression, a depression with a cross section in a dovetail shape is produced, whereby a surface activation is carried out by means of this tool, connecting a subsequently applied coating positively and permanently to the surface.

It is furthermore advantageous that the cutting tool produces in the workpiece at least one depression in the form of a concentric circle or of a plurality of concentric circles by a process in which a plurality of depressions with (a) dovetail-shaped cross section/s is/are structured into the surface of the workpiece by means of a turning process.

It is furthermore advantageous that the at least two cutting edges are arranged at an acute angle to one another, i.e. so as to converge. This means that the point of intersection of the two straight extension lines and two cutting edges is in front of the tool, i.e. within the workpiece.

It is particularly advantageous that the at least two cutting edges consist of two cutting inserts secured on a common tool holder. It is particularly economical here if two standard indexable cutting inserts can be used, thereby making it possible to provide a particularly economical tool since special manufacture is not necessary. This is achieved by a tool consisting of a cutting insert holder on which two standard indexable cutting inserts are secured, wherein the two cutting inserts have at least one acute angle. The two cutting inserts are secured on the cutting tool in such a way that the respective axes of symmetry passing through the corners with the acute angles converge, with the result that the two mirror-symmetrical longitudinal axes intersect outside the tool. In this case, the point of intersection lies within the workpiece during cutting operation of the tool. In this case, the first half of the at least one depression is turned by means of the first cutting insert, wherein said first half advantageously consists of an undercut which tapers with increasing cutting depth. It is advantageous if the second cutting insert simultaneously cuts a further undercut into the workpiece in a horizontally offset position, wherein the tool moves at a feed rate relative to the rotating workpiece, with the result that, after a whole number of workpiece revolutions, the tip of the second cutting inserts is almost precisely at the position at which the tip of the first cutting insert cut the first half of the at least one depression before the whole number of workpiece revolutions. Here, the tip of the second cutting insert likewise cuts an undercut into the workpiece, wherein said second undercut likewise tapers with increasing cutting depth but, owing to the converging orientation of the two cutting insert axes, is arranged as a mirror image of the first undercut. Since both undercuts run almost precisely toward one another but are slightly offset relative to one another, the combination of these two undercuts gives at least one depression, the width of which increases with increasing depth owing to the two undercuts tapering with increasing depth, with the result that a cross-sectional profile of the depression in a dovetail shape is obtained. It is particularly advantageous here that the first of the at least two cutting edges produces the first half of the at least one depression in the surface and, at the same time, the second of the at least two cutting edges produces the second half of the at least one depression in the surface, wherein the second half of the at least one depression complements the first half of the at least one depression in such a way that the at least one depression in a dovetail shape is formed. It is possible here to provide the entire surface with a single spiral depression to cover the surface, said depression being similar in design to a sound groove of a gramophone record and being capable of being produced in a single pass.

It is advantageous if the cutting tool produces one or more spiral depression/s in the workpiece by a process in which the feed rate is matched to the speed of rotation of the workpiece and one or more spiral depressions are produced in a single pass, like the spiral sound groove of a gramophone record.

It is furthermore advantageous that the cutting tool is configured in such a way that the depression produced thereby is a microstructure, in particular that the microstructure has a depth in a range of from 10 μm to 1000 μm.

By virtue of the dovetail-like geometry with an undercut portion, the microstructure advantageously leads to improved adhesion of the layer to be applied. To reduce the process time, it is advantageous here to produce all the structures at the same time with a correspondingly wide tool. In this case, each individual structure can be introduced serially with a single tool, in particular in order to create more flexibility, e.g. in the configuration of the structure spacings or structure depths. A person skilled in the art can find a large number of possible combinations, of cross-sectional profiles, combinations and division of the production process into individual processes within the scope of the disclosure. In comparison with surface activation by means of conventional sandblasting, this method is suitable for large-scale manufacture by virtue of its process capability. In addition to reduced reject costs in comparison with sandblasting, this method offers further cost advantages since no relevant wear phenomena, as in jet machining, occur on the tool and the machine. When this method is employed for castings, there is a further advantage since a turning process is generally used in any case to remove the casting skin or for precise shaping of brake disks, and this turning process can additionally carry out said operation. The entire process chain is thus simplified and leads to further cost advantages. The application of microstructure turning for flat surfaces of brake disks has been carried out by way of example but, in principle, this method is suitable for all turning processes. It is likewise possible, as an alternative for non-rotating surfaces, to produce comparable structures by means of milling, broaching, shaping or planing instead of a turning process.

A tool which consists of a holder and two standard indexable cutting inserts with as small as possible a cutting edge radius is particularly advantageous for the production of specific undercuts. This makes it possible to produce dovetail-like microstructures which are not produced as concentric structures but have a spiral microstructure profile. By virtue of the dovetail-like geometry with an undercut portion, these microstructures lead to improved adhesion of the coating to be applied, wherein a major advantage lies in the very low tool costs since standard indexable cutting inserts can be used. Only the initial setting of the microcutting edges relative to one another may be regarded as an increased cost.

As an alternative to a dovetail-like cross-sectional profile, it is also possible to introduce simple structures which, although they have an increasing width of the cross-sectional profile with increasing depth, can otherwise differ in details from a precise dovetail profile. The advantage of this variant is simplified construction or the omission of setting for the two indexable cutting inserts, although it is disadvantageous here that a smaller number of undercuts is obtained.

Further features, possible applications and advantages of the disclosure will become apparent from the following description of illustrative embodiments of the disclosure, which are shown in the figures of the drawing. Here, all the features described or shown, individually or in any combination, form the subject matter of the disclosure, irrespective of the collation thereof in the description or the dependency references thereof and irrespective of the wording or depiction thereof in the description and in the drawings.

BRIEF DESCRIPTION OF THE DRAWINGS

Illustrative embodiments of the disclosure are explained below with reference to drawings, in which:

FIG. 6 shows the use of the further tool according to the disclosure.

DETAILED DESCRIPTION

Figure 1:
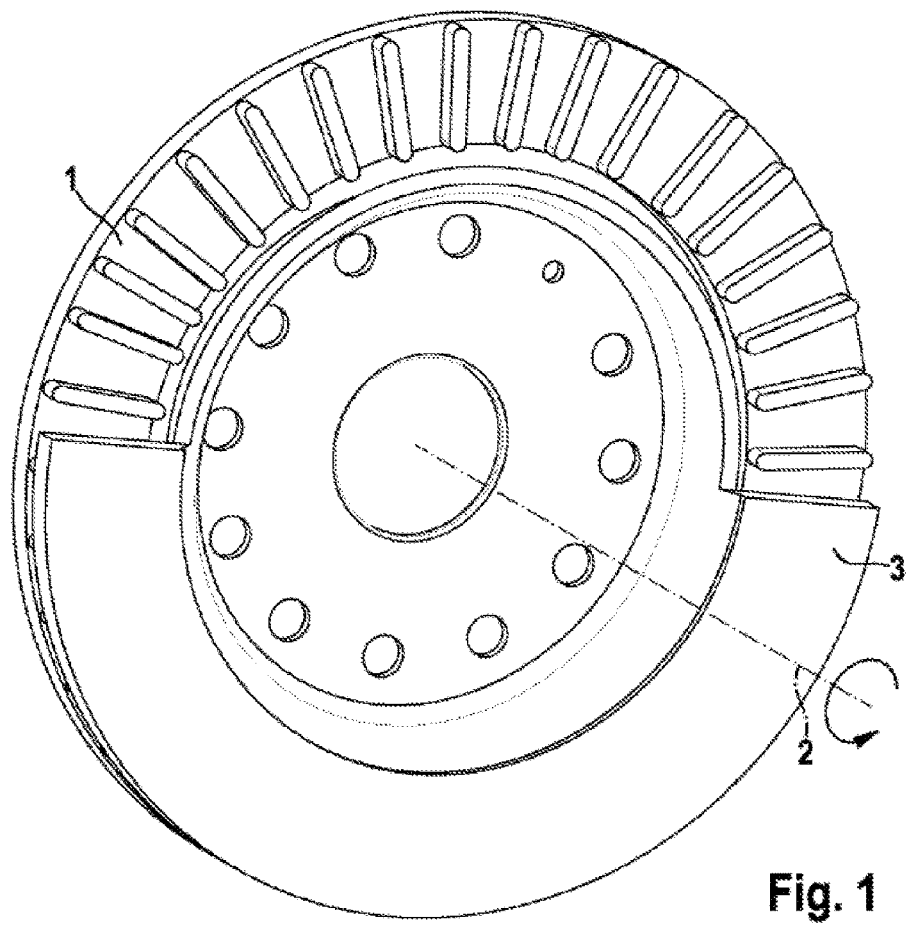
FIG. 1 shows an illustrative workpiece, e.g. a brake disk.

FIG. 1 shows a workpiece 1, which can be embodied as a brake disk for example. A workpiece 1 of this kind has an axis 2 of rotation, around which the workpiece 1 rotates during a turning process. A surface 3 is furthermore provided, which surface is structured by means of the tool and method according to the disclosure and into which a microstructure is introduced to increase the adhesive power of a coating to be applied subsequently, which is applied by means of a flame spraying method or of a plasma spraying method for example.

Figure 2:
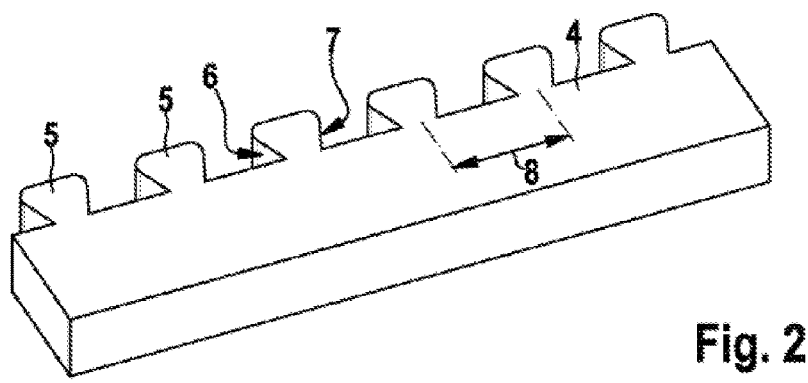
FIG. 2 shows an illustrative embodiment of a first tool according to the disclosure.

FIG. 2 shows an illustrative embodiment of a possible tool 4 for producing the microstructure according to the disclosure. Here, the tool 4 has, on one side, at least two cutting edges 6, 7, which converge in such a way that the extension lines of the two cutting edges 6, 7 intersect on the side facing away from the workpiece 1. This gives a cutting edge profile 5 which is reminiscent of a tooth shape and is referred to below as a cutting tooth 5. Here, the at least two cutting edges 6, 7 form the left-hand and right-hand side flank of the cutting tooth 5 respectively, giving a dovetail shape of the microstructure produced in the workpiece. To increase the efficiency of a tool of this kind, provision is furthermore made to arrange a plurality of cutting teeth 5 along a line of the tool 4, wherein the cutting teeth are advantageously arranged at regular tooth intervals 8.

Figure 3:
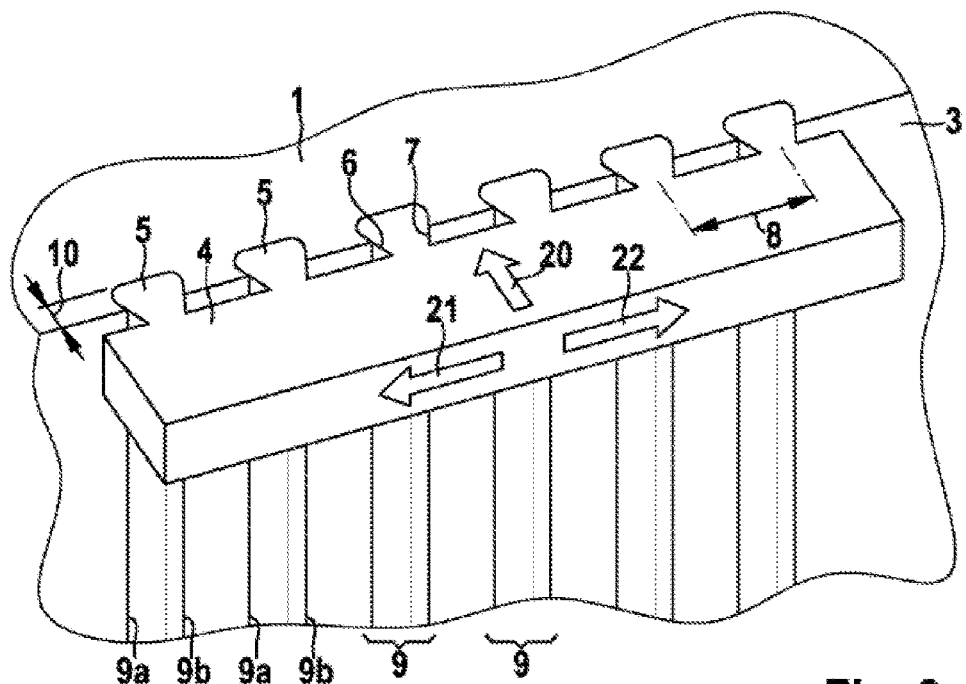
FIG. 3 shows the use of the first tool according to the disclosure.

FIG. 3 shows, by way of example, the use of the tool 4 shown in FIG. 2 to machine the workpiece 1 shown in FIG. 1. The workpiece, e.g. a brake disk, is shown here as a cutaway, whereof the surface 3 to be machined is in an upright position relative to the viewing direction in FIG. 3. The tool 4 is furthermore likewise shown as a cutaway, wherein the cutting teeth 5 arranged at the tooth interval 8 are positioned relative to the workpiece 1 and cut into the surface 3 to be structured. It can be seen here that each cutting tooth 5 has a left-hand and a right-hand side edge, which are known as at least two cutting edges 6, 7 from FIG.

2. During the microstructuring of the surface 3 of the workpiece 1 by means of a turning method, the workpiece 1 rotates relative to the tool 4 in such a way that the portion of the workpiece 1 shown in FIG. 3 moves downward, and the workpiece 1 overall performs a rotation about a horizontal axis 2 of rotation, as shown in FIG. 1. During this process, the cutting teeth 5 cut into the surface 3 and produce regular depressions 9 in the surface 3 at intervals 8 when the tool 4 is moved toward the workpiece 1 in the plunge-cutting direction 20. Once the tool 4 has been fed into the workpiece 1 to such an extent that the cutting edges 6, 7 produce depressions with a desired depth 10, the tool 4 is moved parallel to the surface 3 in a first direction 21 of movement. During this first movement 21, the first cutting edge 6 widens the depression 9 in such a way that a first undercut 9a is formed on the left-hand edges of the depressions 9. Movement then takes place in a second direction 22 of movement, in which the tool 4 is likewise moved parallel to the surface 3 but now in the opposite direction to the workpiece 1. During this process, the second side flank 7 of the cutting teeth 5 now cuts a second undercut 9b into the right-hand edges of the depressions 9, with the result that the depressions 9 have respective mirror-image undercuts on the two sides 9a and 9b. The tool 4 is then moved somewhat in direction 21 again, with the result that the cutting teeth 5 assume a central position in the depressions 9 and can be moved out of the depressions 9, counter to the plunge-cutting direction 20, without touching the workpiece. The microstructures 9 which are produced during this procedure are shown once again on a larger scale in FIG. 4.

Figure 4:
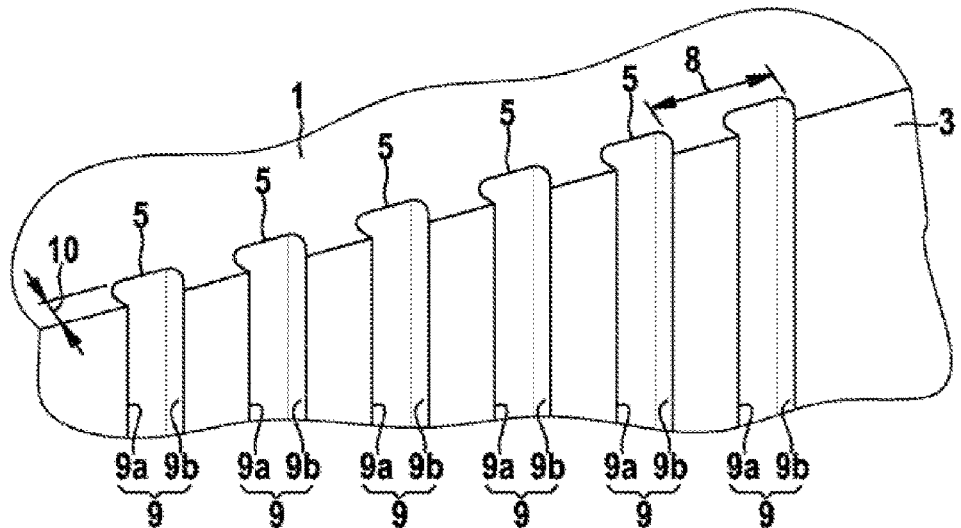
FIG. 4 shows the activated surface after the machining according to the disclosure.

In FIG. 4, the workpiece 1, e.g. a brake disk, is again illustrated, being shown in a cutaway view, having a surface 3 that is to be structured by means of a turning method and, in FIG. 4, as in FIG. 3, facing forward. Depressions 9, spaced apart at a tooth interval 8, have been introduced into this surface 3. Here, the depth 10 of the depressions is the depth of the plunge cut of the tool, which can be in a range of from 10 μm to 1000 μm. The depressions 9 each furthermore consist of two undercuts 9a, 9b, with the first undercut 9a in each case being shown at the left-hand edge of the depression 9 and the second undercut 9b being shown at the right-hand edge of the depression 9 in each case. These two undercuts 9a, 9b result in cross-sectional profiles of a dovetail-like shape which allow positive connection to a coating to be applied subsequently.

Figure 5:
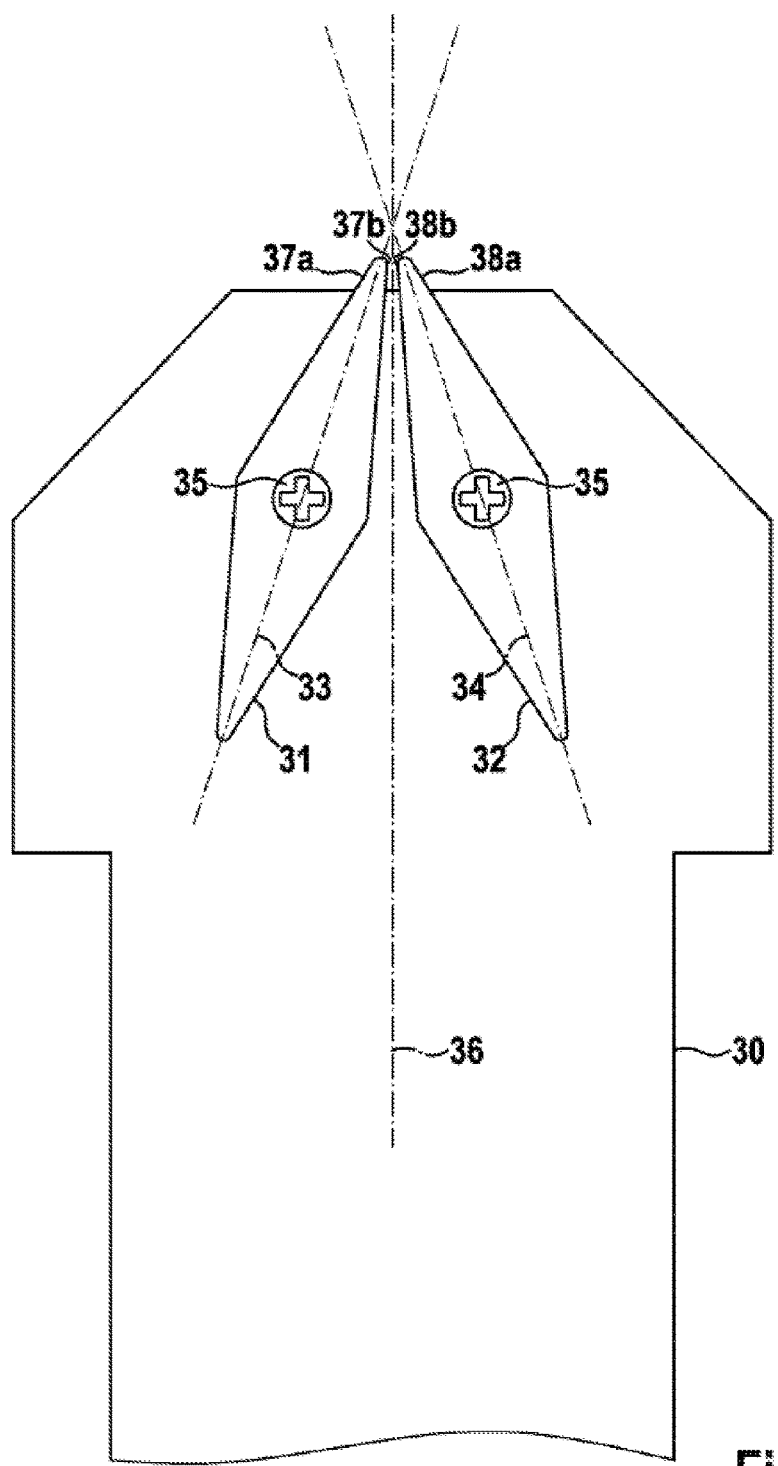
FIG. 5 shows an illustrative embodiment of a further tool according to the disclosure.

FIG. 5 shows another illustrative embodiment of a tool 30 according to the disclosure, in which a cutting insert holder 30 accommodates two standard indexable cutting inserts 31, 32. Both cutting inserts 31, 32 are secured on the cutting tool 30 by means of fastening screws 35. Here, the two cutting inserts 31, 32 are arranged adjacent to one another in such a way that one corner and at least one cutting edge in each case projects at the top above the edge of the cutting tool. Here, the cutting inserts 31, 32 are chosen in such a way that the tip, which projects at the top above the edge of the tool, has as acute an angle as possible with as small as possible a radius in order to be able to produce as small as possible a microstructure in the form of the depressions 9, 42, 43 with as shallow a depth 10 as possible. Both cutting inserts 31, 32, which are advantageously diamond shaped, are secured on the cutting insert holder 30 in such a way that the axes 33, 34 of symmetry of the inserts 31, 32 are not parallel in the longitudinal direction but converge and intersect outside the cutting insert holder 30. The cutting insert holder is likewise advantageously manufactured so as to be symmetrical, with the result that the point of intersection of the two longitudinal axes 33, 34 of the cutting inserts lies on the center line 36 of the cutting insert holder. Here, the slope of the two center lines 33, 34 of the cutting inserts relative to one another must be sufficiently steep to ensure that the two inner cutting edges 37b and 38b of the two cutting inserts 31 and 32 likewise converge and that the imaginary extension lines thereof intersect above the tool. If these two inner cutting edges 37b and 38b run parallel to one another or even diverge outward, with the result that the extension lines intersect within the cutting insert holder 30 or below the latter, it is not possible to produce undercuts 9a, 9b, 42, 43 in the surface 3 of the workpiece 1 in the manner shown in FIG. 6. Here, the outer edges 37a and 38a of the cutting tool advantageously likewise have cutting edges since the advantageous standard indexable cutting inserts described usually have cutting edges 37a, 37b, 38a, 38b running around on both sides, which also allow the tool 30 to be plunged into the surface 3 of the workpiece 1 in a simple manner.

FIG. 6 shows the use of the tool 30 described in FIG. 5 to produce dovetail-like depressions 42, 43 in a surface 3 of a workpiece 1. Here, the cutting insert holder 30 is not shown for reasons of clarity, but the cutting inserts 31 and 32 which project above said holder are shown in part. Since the cutting inserts 31, 32 move relative to the workpiece 1 with a feed motion 41, which is indicated by a rightward-pointing arrow in FIG. 6, a leading cutting edge 32 and a trailing cutting edge 31 result from this orientation. Here, the leading cutting edge 32 is positioned in such a way with the center line 34 thereof that it points away from the feed direction, and the inner, leading cutting edge 38 likewise slopes to such an extent that it slopes counter to the feed direction 42. When this leading cutting edge 32 is in contact with the workpiece 1, it produces a depression 42 that forms the first part of the subsequent microstructure 9. Owing to the slope described of the inner cutting edge 38b, a first undercut 42 is obtained, forming an undercut on the left-hand side (i.e. counter to the feed direction) in the depression but tapering with increasing depth 10 of the depression. The feed rate 42, which is matched to the speed of rotation of the workpiece 1, results in an encircling spiral partial depression 42. The precise matching of the feed rate 41, of the speed of rotation and of the spacing of the two cutting edge tips makes it possible for the trailing cutting edge 31 to cut in almost exactly in the depression of the leading cutting edge 32b while being offset slightly in the feed direction, with the result that the first half 42 of the microstructure 9, said first half being produced by the leading cutting edge 32, is complemented by the second half 43 which then follows. In this case, the trailing cutting insert 31 slopes in the opposite direction to the leading cutting insert 32b in such a way that the center line 33 slopes in the feed direction in the longitudinal direction of the cutting insert 31. Here too, it is necessary that the slope should be so pronounced that the inner, trailing cutting edge 37b should likewise slope in the direction of the leading cutting edge 32b (i.e. in the feed direction 41). This second, trailing cutting edge 37b produces a plunge cut 43 which, owing to the slope described of the trailing cutting insert 31, likewise produces an undercut 43, which is mirror-symmetrical with respect to the first depression 42. Since both depressions 42 and 43 are produced almost one on top of the other in the workpiece 1 and are only slightly offset horizontally relative to one another, the two undercuts 42 and 43 complement one another to form a dovetail-like microstructure 9, the width of which increases with increasing depth 10. In this case, the second half 43 of the microstructure 9 is produced simultaneously with the first half 42 of the microstructure 42 but, owing to the spacing between the two cutting edges, the speed of rotation and the feed rate, which is likewise matched thereto, the second half 43 of the microstructure 9 is completed only after a whole number of revolutions of the workpiece 1 in the same location at which the leading cutting edge 32 has generated the first half 42 of the microstructure 9. This results in a microstructure 9 extending on the surface 3, said microstructure extending in a spiral similar to a sound groove of a gramophone record and being repeated at regular intervals 39 due to the spiral shape. Both undercuts 42 and 43 are thus produced simultaneously but at different positions, and therefore the two undercuts 42 and 43 are produced one after the other in a single position and yet, by virtue of the encircling spiral structure, are produced simultaneously and in parallel in a single pass. The two inner cutting edges 37b and 38b thus form the two side flanks of the microstructure 9, and therefore the opening angle 40 of the microstructure is the same angle as the slope angle of the two inner cutting edges 37b and 38b relative to one another. The two outer cutting edges 37a and 38a cut surfaces out of the workpiece surface which merge into one another and connect the two halves 42 and 43 of the microstructure 9, wherein the angle of the two outer cutting edges 37a and 38a relative to one another is of secondary importance.

The invention claimed is:

1. A method for treating a surface of a brake disk to increase adhesion of a coating on the surface, comprising:
   forming at least one depression on the surface, the at least one depression having a width which increases as a depth of the at least one depression increases, and
   applying the coating to the surface of the brake disk, the coating having a thickness greater than the depth of the last one depression such that the at last one depression is completely filled with the coating, the applied coating forming an outermost layer of the brake disk,
   wherein forming the at least one depression includes machining the surface along a spiral path that at least partially encircles a rotational axis of the brake disk.

2. The method as claimed in claim 1, wherein forming at least one depression includes moving a tool having a plurality of cutting edges on a workpiece at a feed rate matched to a speed of rotation of the workpiece to form a first undercut on a first side flank of the at least one depression with a first cutting edge of the tool and to simultaneously form a second undercut on an opposite side flank of the at least one depression with a second cutting edge of the tool.

3. The method as claimed in claim 2, wherein the tool includes a first insert defining the first cutting edge and a second insert defining the second cutting edge.

4. The method as claimed in claim 3, wherein the first insert and the second insert are secured to the tool, wherein the first insert defines a first axis of symmetry and the second insert defines a second axis of symmetry, and wherein the first axis of symmetry is not parallel to the second axis of symmetry.

5. The method as claimed in claim 4, wherein the first axis of symmetry and the second axis of symmetry converge outside of the tool.

6. The method as claimed in claim 5, wherein the tool is symmetrical and defines a tool axis, and wherein the first axis of symmetry of the first insert and the second axis of symmetry of the second insert converge at a point that lies on the tool axis.

7. The method as claimed in claim 2, wherein:
   the first cutting edge forms a first partial depression in the surface,
   the second cutting edge forms a second partial depression in the surface, and
   the first partial depression and the second partial depression define the at least one depression.

8. The method as claimed in claim 7, wherein the second partial depression is completed only after a whole number of revolutions of the brake disk in the same location at which the first partial depression is formed.

9. The method as claimed in claim 1, wherein forming the at least one depression includes:
   forming a first undercut on a first side flank of the at least one depression; and
   forming a second undercut on an opposite side flank of the at least one depression.

10. The method as claimed in claim 1, wherein forming the at least one depression includes forming a plurality of depressions simultaneously with a single tool.

11. A brake disk, comprising:
    a surface having a structure configured to increase an adhesive power of a coating on the surface, the coating composed of a material with a high abrasion resistance and disposed on the surface so as to form an outermost layer of the brake disk,
    wherein the structure of the surface has at least one depression that at least partially encircles a rotational axis of the brake disk along a spiral path,
    wherein a width of the at least one depression increases as a depth of the at least one depression increases, and
    wherein a thickness of the coating is greater than the depth of the at least one depression such that the at least one depression is completely filled with the coating.

12. The brake disk as claimed in claim 11, wherein the at least one depression has a cross-sectional profile in a dovetail shape.

13. The brake disk as claimed in claim 12, wherein the cross-sectional profile includes a first side flank and a second side flank that diverge from one another in the direction of the depth of the at least one depression and a bottom edge that approximately defines the depth of the at least one depression.

14. The brake disk as claimed in claim 13, wherein an intersection of the first side flank and the bottom edge forms a first radius at a first corner of the depression, and wherein an intersection of the of the second side flank and the bottom edge forms a second radius at a second corner of the depression.

15. The brake disk as claimed in claim 11, wherein:
    the at least one depression is formed in regions of the brake disk where the coated brake disk subsequently comes into contact with brake pads, and
    the at least one depression is configured to produce a positive connection between the coating and the brake disk.

* * * * *